United States Patent
Cecchin et al.

(10) Patent No.: US 6,437,047 B1
(45) Date of Patent: Aug. 20, 2002

(54) POLYETHYLENE COMPOSITIONS HAVING IMPROVED MECHANICAL PROPERTIES AND IMPROVED PROCESSABILITY IN THE MELTED STATE

(75) Inventors: Giuliano Cecchin; Gianni Collina; Massimo Covezzi; Marco Ciarafoni; Remo Anibaldi, all of Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/743,122

(22) PCT Filed: Jul. 2, 1999

(86) PCT No.: PCT/EP99/04597

§ 371 (c)(1),
(2), (4) Date: Jan. 5, 2001

(87) PCT Pub. No.: WO00/02960

PCT Pub. Date: Jan. 20, 2000

(30) Foreign Application Priority Data

Jul. 7, 1998 (IT) .......................................... MI98A1547

(51) Int. Cl.⁷ ......................... C08L 23/00; C08L 23/16; C08L 23/18
(52) U.S. Cl. ....................... 525/191; 525/240; 428/500; 428/515; 428/516
(58) Field of Search .................................. 525/191, 240; 428/500, 515, 516

(56) References Cited

U.S. PATENT DOCUMENTS

| 4,871,813 A |   | 10/1989 | Senez .......................... 525/240 |
| 5,206,075 A | * | 4/1993 | Hodgson, Jr. ................ 428/216 |
| 5,358,792 A | * | 10/1994 | Mehta et al. ................ 428/516 |
| 5,455,303 A |   | 10/1995 | Panagopoulos, Jr. et al. . 525/95 |
| 5,561,195 A | * | 10/1996 | Govoni et al. ............... 525/240 |
| 5,674,945 A |   | 10/1997 | Takahashi et al. .......... 525/240 |

FOREIGN PATENT DOCUMENTS

| WO | 9214784 | 9/1992 |
| WO | 9303078 | 2/1993 |
| WO | 9520009 | 7/1995 |
| WO | 9748554 | 12/1997 |

\* cited by examiner

*Primary Examiner*—Nathan M. Nutter

(57) ABSTRACT

Polyethylene composition comprising (percentages by weight): A) from 60 to 95% of an LLDPE copolymer having a density from 0.905 to 0.935 g/cm³, $\bar{M}_w/\bar{M}_n$ values less than 4 and F/E ratio values from 10 to 20; B) from 5 to 40% of one or more crystalline copolymers of propylene selected among defined copolymers of propylene with ethylene and/or higher alpha-olefins.

7 Claims, No Drawings

POLYETHYLENE COMPOSITIONS HAVING IMPROVED MECHANICAL PROPERTIES AND IMPROVED PROCESSABILITY IN THE MELTED STATE

The present invention concerns polyethylene compositions comprising a linear low-density copolymer of ethylene (LLDPE) having a narrow distribution of molecular weights, and a crystalline copolymer of propylene.

The films obtainable from the said compositions possess an improved balance of mechanical properties and good optical properties.

Moreover, the aforesaid compositions are readily processable in the melted state, since they do not require large expenditures of energy in the machines used for their processing and do not cause high pressures at the head in the machines themselves.

The copolymer of ethylene used for the compositions of the present invention possesses a molecular weight distribution, in terms of the ratio between the weight-average molecular weight ($\overline{M}_w$) and the number-average molecular weight ($\overline{M}_n$), that is in terms of $\overline{M}_w/\overline{M}_n$, which is particularly narrow (corresponding to values of $\overline{M}_w/\overline{M}_n$ less than 4) and hence typical of the polyethylenes obtained with metallocene catalysts.

In that respect, the compositions of the present invention differ from the compositions described in published patent applications We 93/03078 and WO 95/20009, in which the LLDPE copolymer (which is mixed with a crystalline copolymer of propylene) is prepared with Ziegler-Natta catalysts and hence possesses values of $\overline{M}_w/\overline{M}_n$ typically greater than or equal to 4.

According to U.S. Pat. No. 4,871,813, it is possible to prepare LLDPE copolymers having MW/Mh values less than 4 (from 2.5 to 6) even when the catalyst used is of the Ziegler-Natta type, however in the examples only an LLDPE copolymer having a $\overline{M}_w/\overline{M}_n$ value of 4 is used.

Also in the US patent cited the LLDPE copolymer is mixed with a copolymer of propylene, however the crystallinity of that copolymer of propylene is rather low, as is indicated by the low values of the enthalpy of fusion (less than or equal to 75 J/g) and, in particular, the degree of crystallinity (less than 35%).

The aforesaid documents show that by the addition of the copolymer of propylene to the LLDPE copolymer, polyethylene compositions having improved processability in the melted state, in the aforesaid sense, are obtained.

According to U.S. Pat. No. 4,871,813, this effect is obtained without substantially changing the optical and mechanical properties of the film, compared to those of a film obtained from the pure LLDPE copolymer.

According to published patent application WO 95/20009, as well as improving the processability in the melted state, the addition of the crystalline copolymer of propylene is capable of improving the resistance of the polyethylene film to impact and to tearing.

However, the mechanical properties of the compositions comprising an LLDPE copolymer obtained with Ziegler-Natta catalysts and a copolymer of propylene are inferior, in particular as regards the impact resistance (Dart Test), to those typical of an LLDPE copolymer obtained with metallocene catalysts.

The LLDPE copolymers obtained with metallocene catalysts in general show Dart Test values (measured on blown film of thickness 25 μm by the method described in the examples) higher than about 300 g.

Corresponding to the said high Dart Test values, such LLDPE copolymers also have satisfactory tear resistance values (Elmendorf), which generally vary in inverse proportion, i.e. they increase with decreasing Dart Test values, and excellent optical properties.

However, the LLDPE copolymers obtained with metallocene catalysts display unsatisfactory processability in the melted state, attributable to the narrow distribution of molecular weights that characterizes them.

Hence, it would be particularly desirable to obtain polyolefin compositions having the aforesaid high levels of impact resistance, with the best balance possible of impact resistance and tear resistance, improved optical properties, and good processability in the melted state.

In U.S. Pat. No. 5,674,945, polyethylene compositions comprising an LLDPE copolymer obtained with metallocene catalysts and a copolymer of propylene having a density greater than or equal to 0.900 g/cm$^3$ are described.

In particular, in the examples a copolymer containing 0.2 mole % of butene and a copolymer containing 3.4 mole % of ethylene and 1.6 mole % of butene is used.

In both cases, the relative quantity of propylene copolymer in the polyethylene compositions is 10% by weight, and the transparency of the films obtained from such compositions is found to be substantially unchanged compared to the transparency of the films obtained from the corresponding LLDPE copolymers in the pure state.

Moreover, the films obtained from the aforesaid compositions show high tensile modulus values, superior to those of the films obtained from the corresponding LLDPE copolymers in the pure state, and high breaking strain values.

The technical problem consisting in obtaining excellent balances of impact resistance and tear resistance is not considered.

Polyethylene compositions have now been produced which fully satisfy the aforesaid requirements, thanks to an unusual and particularly favourable balance of mechanical and optical properties and processability in the melted state.

Hence, the present invention provides polyethylene compositions comprising (percentages by weight):

A) from 60 to 95%, preferably from 60 to 90%, more preferably from 70 to 88%, of a copolymer of ethylene with an alpha-olefin $CH_2=CHR$, in which R is an alkyl radical containing from 1 to 18 atoms of carbon (LLDPE copolymer), the said copolymer having a density from 0.905 to 0.935 g/cm$^3$, preferably from 0.910 to 0.930, more preferably from 0.915 to 0.925 g/cm$^3$ (measured according to ASTM D 4883), $\overline{M}_w/\overline{M}_n$ values less than 4, preferably from 1.5 to 3.5, more preferably from 1.5 to 3 (measured by GPC, i.e. gel permeation chromatography) and values of melt flow rate F/E ratio from 10 to 20, preferably from 12 to 20 (measured according to ASTM D 1238);

B) from 5 to 40%, preferably from 10 to 35%, more preferably from 12 to 30%, of one or more crystalline copolymers of propylene selected among (i) copolymers of propylene with ethylene containing from 3 to 8%, preferably from 4 to 6%, of ethylene; (ii) copolymers of propylene with one or more alpha-olefins $CH_2=CHR^I$, where $R^I$ is an alkyl radical having from 2 to 8 carbon atoms or an aryl radical, containing from 6 to 25%, preferably from 8 to 20%, of alpha-olefins $CH_2=CHR^I$; (iii) copolymers of propylene with ethylene and one or more alpha-olefins $CH_2=CHR^I$, where $R^I$ has the aforesaid meaning, containing from 0.1 to 8%, preferably from 0.5 to 5%, more preferably from 1 to 4%, of ethylene, and from 0.1 to 20%, preferably from 1 to 15%, more preferably from 2.5 to 15%, in particular from, 2.5 to 10%, of alpha-olefins $CH_2=CHR^I$, with the proviso that the total content of ethylene and alpha-olefins $CH_2=CHR^I$ in the copolymers (iii) is greater than or equal to 5%.

Optionally, in order to improve the optical properties, the compositions of the present invention can contain, in addition to the components A) and B), from 0.5 to 10%, preferably from 1 to 6%, by weight of an LDPE polyethylene (component C)), with respect to the total weight of A)+B)+C).

As seems clear from the foregoing description, polymers containing two or more types of comonomers are also included in the definition of copolymers.

The aforesaid compositions are generally characterized by Dart Test values greater than or equal to 300 g, preferably greater than or equal to 350 g, in particular between 300 and 800 g, preferably between 350 and 800 g (measured on blown film of thickness 25 μm by the method described in the examples).

Moreover, the compositions of the present invention show particularly high tear resistance values (Elmendorf), both as such and compared to the Dart Test values. Generally, such values are greater than or equal to 400 g (measured on blown film of thickness 25 μm by the method described in the examples) in the transverse direction (TD), in particular between 400 and 800 g, and greater than or equal to 200 g in the machine direction (MD), preferably greater than or equal to 250 g, in particular between 200 and 500 g, preferably between 250 and 500 g.

Generally, the component A) of the compositions of the present invention has an ethylene content greater than or equal to 60% by weight, in particular from 60 to 99%, preferably greater than or equal to 70% by weight, in particular from 70 to 99%, more preferably greater than or equal to 80% by weight, in particular from 80 to 99%.

Examples of alpha-olefins $CH_2=CHR$ present in the component A) of the compositions of the present invention are propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

Preferred examples are 1-butene, 1-hexene and 1-octene.

Generally, the component A) has Melt Flow Rate E values (MFR E according to ASTM D 1238) from 0.1 to 100 g/10 min.

Moreover, the said component A) preferably has a content of fractions soluble in xylene at 25° C. less than or equal to 5% by weight.

The DSC (Differential Scanning Calorimetry) trace of the said component A) preferably shows a single melting peak (typical of one crystalline phase); this peak is generally situated at a temperature greater than or equal to 100° C.

The LLDPE copolymers having the characteristics quoted above for the component A) are known in the art and can be obtained by conventional polymerization processes (in gas phase, in suspension or in solution) using metallocene catalysts, optionally supported on solid supports (for example silica or porous polymeric supports).

The metallocene catalysts are prepared by combining a metallocene compound of a transition element generally selected in the groups IV B, V B or VI B of the periodic table of the elements, in particular titanium, zirconium or hafnium, and a co-catalyst, in particular an alumoxane.

The metallocene compound can be generally represented by the formula:

$$Cp_xMA_yB_z$$

where Cp is a cyclopentadiene ring, which can also be part of polycyclic structures such as indenyl or fluorenyl, x is 1, 2 or 3, M is the aforesaid transition element, A and B, the same or different, are selected among hydrogen, halogens and alkyl groups, optionally containing heteroatoms, y and z are 0 or whole numbers greater than 0, with the proviso that the sum of x, y and z corresponds to the oxidation state of M.

Preferably, at least one of the cyclopentadiene rings Cp is substituted, in particular with alkyl substituents; moreover two cyclopentadiene rings can be joined together by bivalent groups, for example alkylene (polymethylene) or dialkylsilane groups.

Specific examples are the derivatives of bis (cyclopentadienyl)zirconium dichloride having variously substituted cyclopentadiene rings.

The alumoxanes comprise the oligomeric linear compounds of formula:

$$R-[Al(R)-O]_n-AlR_2$$

and cyclic ones of formula:

$$[-Al(R)-O-]_m$$

where n varies for instance from 1 to 40, m from 3 to 40 and R is an alkyl group preferably containing from 1 to 8 atoms of carbon.

A specific example is methylalumoxane.

Alternatively to the alumoxanes, compounds capable of forming a metallocene alkyl cation can be used as co-catalysts.

Examples of such compounds are the compounds of formula $Y^+Z^-$, where $Y^+$ is a Brønsted acid, capable of donating a proton and of reacting irreversibly with a substituent A or B of the metallocene compound and $Z^-$ is a compatible anion, which does not coordinate, which is capable of stabilizing the active catalytic species which originates from the reaction of the two compounds, and which is sufficiently labile to be able to be displaced by an olefinic substrate. Preferably the anion ⁻ includes one or more atoms of boron, more preferably it is an anion of formula $BAr_4^{(-)}$ where the substituents Ar, the same or different, are aryl radicals such as phenyl, pentafluorophenyl and bis(trifluoromethyl)phenyl.

Particularly preferred is tetrakis-pentafluorenyl-borate. In addition, the compounds of the formula $BAr_3$, where B is boron and the substituents Ar, the same or different, have the meaning described above, can advantageously be used.

Examples of the aforesaid catalysts and polymerization processes are described in the already cited U.S. Pat. No.

5,647,945 and in published patent applications EP-A-129 368 and WO 94/26816.

Examples of alpha-olefins $CH_2=CHR^1$ present in the component B) of the compositions of the present invention are 1-butene, 1-pentene, 4-methylpentene-1, 1-hexene and 1-octene. 1-butene is preferred.

Generally, the component B) has Melt Flow Rate L values (MFR L according to ASTM D 1238) from 0.1 to 500 g/10 min, preferably from 1 to 50, more preferably from 6 to 25 g/10 min.

Preferably the said component B) has density values (measured according to ASTM D 4883) less than 0.9 g/cm³, in particular from 0.890 to 0.899, more preferably from 0.892 to 0.899.

Moreover, the said component B) preferably has the following characteristics:
- content of fraction insoluble in xylene at 25° C. greater than 70% by weight, more preferably greater than or equal to 75%, in particular greater than or equal to 85% by weight;
- enthalpy of fusion (measured according to ASTM D 3418-82) greater than 50 J/g, more preferably greater than or equal to 60 J/g, in particular greater than or equal to 70 J/g, for example from 75 to 95 J/g;
- melting point (measured according to ASTM D 3418-82) less than 140° C., more preferably from 120 to 140° C.;
- $\overline{M}_w/\overline{M}_n$ values greater than 3.5, in particular from 3.5 to 15.

The crystalline copolymers of propylene having the characteristics quoted above for the component B) are known in the art, and can be obtained by conventional polymerization processes using stereospecific Ziegler-Natta catalysts supported on magnesium halides. Such catalysts contain, as an essential component, a solid catalytic component comprising a compound of titanium having at least one titanium-halogen bond and one electron-donor compound, both supported on a magnesium halide. As co-catalysts, an Al-alkyl compound and an electron-donor compound are generally used.

Catalysts having the aforesaid characteristics are for example described in U.S. Pat. No. 4,399,054 and in European patent 45977.

The LDPE polymer (low density polyethylene) constituting the component C) of the compositions of the present invention is a homopolymer of ethylene or a copolymer of ethylene containing smaller quantities of comonomers, such as butyl acrylate, prepared by polymerization at high pressure using free radical initiators.

The density of the said LDPE polymer generally varies from 0.910 to 0.925 g/cm³ (measured according to ASTM D 4883).

The MFR E values of the said LDPE polymer generally vary from 0.1 to 50 g/10 min, preferably from 0.3 to 20 g/10 min.

The LDPE polymers having the characteristics quoted above for the component C) are known in the art. Specific examples are the commercially available polymers with the trade names Escorene®, and Lupolen® (BASF).

In addition to the aforesaid components, the compositions of the present invention can contain other polymeric components, such as olefinic elastomers, in particular ethylene/propylene (EPR) or ethylene/propylene/diene (EPDM) elastomers, and additives commonly used in the art, such as stabilizers (in particular phenolic antioxidants and process stabilizers such as the organic phosphates), pigments, fillers, nucleating agents, slipping agents, lubricating and antistatic agents, flame retardants and plasticizers.

The compositions of the present invention can be prepared by processes of polymerization in two or more consecutive stages, using in at least one stage the metallocene catalysts described above for the preparation of the component A) and in at least one other stage the Ziegler-Natta catalysts described above for the preparation of the component B) and optionally adding the component C) by mixing in the melted state.

Naturally, it is also possible to prepare the compositions of the present invention by mixing of the components A), B) and optionally C) in the melted state.

The processes of mixing in the melted state that can advantageously be used are of conventional type and are based on the use of mixing devices known in the art, such as single-screw and double-screw extruders.

In view of their ready processability in the melted state and their excellent mechanical properties, the compositions of the present invention are particularly suitable for the preparation of moulded articles in general, and in particular of film, monolayer or multilayer, whether cast or mono- or biaxially oriented, including blown films, in which at least one layer comprises the aforesaid compositions.

The processes for the preparation of blown film are well known in the art and comprise a stage of extrusion through a head with an annular aperture.

The product from this stage is a tubular extrudate which is then inflated with air, to obtain a tubular bubble which is cooled and collapsed to obtain the film.

The following examples are given in order to illustrate but not to limit the present invention.

For these examples, the following materials are used.

A) LLDPE Copolymer

Ethylene/1-hexene copolymer, containing 7.6% by weight of 1-hexene (determined by IR spectroscopy) and having the following characteristics:

| | |
|---|---|
| Density (ATM D 4883): | 0.9190 g/cm³ |
| $\overline{M}_w/\overline{M}_n$ (CPC): | 2.5 |
| MFR E (ASTM D 1238): | 1.0 g/10 min |
| F/E (ASTM D 1238): | 16 |
| Soluble in xylene at 25° C. (wt %): | 1 |

B) Crystalline Propylene Copolymer

The propylene copolymers B1)–B3), having the following characteristics, are used:

| | B1) | B2) | B3) |
|---|---|---|---|
| Butene content (wt %): | 5.3 | — | — |
| Ethylene content (wt %): | 2.21 | 3.3 | 3.3 |
| Density (g/cm³): | 0.895 | 0.898 | 0.898 |
| MFR L (g/10 min): | 6 | 2 | 9 |
| Soluble in xylene at 25° C. (wt %): | 10 | 7 | 7 |

The aforesaid butene and ethylene contents are measured by IR spectroscopy, the density by ASTM D 4883, and the content of insoluble in xylene (and hence the content of soluble), both for the component A) and for the component B), is determined by the following method.

2.5 g of copolymer together with 250 cm³ of o-xylene are placed in a conical glass flask, equipped with condenser and magnetic stirrer. The temperature is raised until the boiling point of the solvent is reached in 30 min. The clear solution thus formed is left at reflux with stirring for another 30 min. The closed flask is then placed in a bath of water and ice for 30 min and then in a bath of water thermostatted at 25° C. for 30 min. The solid formed is filtered on paper at a high filtration rate. 100 cm³ of the liquid obtained from the filtration are poured into an aluminium container, previously weighed, and the whole is placed on a heating plate to evaporate the liquid in a current of nitrogen. The container is then placed in an oven at 80° C. and kept under vacuum until constant weight is attained.

The aforesaid propylene copolymers are prepared using high yield and stereospecificity Ziegler-Natta catalysts, supported on magnesium chloride, in the polymerization.

C) LDPE Polymer

A homopolymer of ethylene prepared by polymerization in the presence of free radical initiators, having density values of 0.919 g/cm³ (measured according to ASTM D 4883) and MFR E values of 0.3 g/10 min (ASTM D 1238).

EXAMPLES 1–5

The aforesaid components A), B1)–B3) and C) are mixed in the melted state in a single-screw extruder (Bandera TR-60) under the following conditions:

| Temperature profile: | 185, 195, 200, 205, 210, 215, 235, melted 230° C.; |
|---|---|
| Screw revolutions: | 70 rpm; |
| Throughput: | 67 kg/h. |

The relative quantities (% by weight) relative to the total weight of the composition) of the aforesaid components for each example are shown below.

| | Example No. | | | | |
|---|---|---|---|---|---|
| | 1 | 2 | 3 | 4 | 5 |
| A) | 80 | 80 | 80 | 70 | 77.68 |
| B1) | 20 | — | — | — | 19.42 |
| B2) | — | 20 | — | 30 | — |
| B3) | — | — | 20 | — | — |
| C) | — | — | — | — | 2.9 |

From the compositions thus obtained, blown films of 25 μm thickness are prepared using a COLLIN-25 machine under the following conditions:

| Temperature profile: | 155, 165, 175, 185, 190, 190, 190, 190, melted 200° C.; |
|---|---|
| Screw revolutions: | 90 rpm; |
| Throughput: | 4.2 kg/h; |
| Blow-up ratio: | 2.5. |

For each example, the properties set out in Table 1 are measured on the films thus prepared. For comparison purposes, Table 1 also shows the properties of blown films obtained and subjected to testing under the same conditions as in examples 1–5, but using the component A) in the pure state (reference example 1) or an LLDPE copolymer in the pure state, containing 10.5% by weight of 1-octene and having the following characteristics (reference example 2):

| Density: | 0.9175 g/cm³; |
|---|---|
| $\overline{M}_w/\overline{M}_n$: | 5 |
| MFR E: | 1.00 g/10 min; |
| F/E: | 31. |

TABLE 1

| Ex. No. | 1 | 2 | 3 | 4 | 5 | Ref. 1 | Ref. 2 |
|---|---|---|---|---|---|---|---|
| Head pressure (MPa) | 22 | 26 | 19.5 | 21 | 19.7 | 27 | 26 |
| Motor input (A) | 8.8 | 9.0 | 8.2 | 8.5 | 9.1 | 9.3 | 8.1 |
| Haze (%) | 28 | 33 | 27 | 27 | 6 | 30 | 19 |
| Gloss (‰) | 22 | 24 | 25 | 27 | 65 | 25 | 39 |
| Dart Test (g) | 560 | 375 | 365 | 330 | 390 | 860 | 270 |
| Elmendorf | | | | | | | |
| TD (g) | 570 | 450 | 490 | 435 | 645 | 330 | 600 |
| MD (g) | 350 | 240 | 320 | 245 | 295 | 310 | 370 |

With reference to Table 1, the head pressure corresponds to the pressure measured at the head of the extruder while the number of revolutions of the motor relate to the extruder motor.

Further, the properties of the films shown in Table 1 are measured by the following standard ASTM methods:

| Haze: | ASTM D 1003 |
|---|---|
| Gloss: | ASTM D 2457 |
| Dart Test: | ASTM D 1709 |
| Elmendorf: | ASTM D 1922. |

What is claimed is:

1. Polyethylene composition comprising (percentages by weight):
    A) from 60 to 95% of a copolymer of ethylene with an alpha-olefin $CH_2=CHR$, wherein R is an alkyl radical containing from 1 to 18 atoms of carbon, the said copolymer having a density from 0.905 to 0.935 g/cm³, $M_w/M_n$ values less than 4, and F/E ratio values greater than 20;
    said copolymer being obtained by using catalysts comprising a compound of a transition element, wherein this element is bound to at least one cyclopentadienyl group, and a cocatalyst;
    B) from 5 to 40% of one or more crystalline copolymers of propylene selected from among (4) copolymers of propylene with ethylene containing from 3 to 8% of ethylene; (ii) copolymers of propylene with one or more alpha-olefins $CH_2=CHR^I{}_r$, where $R^I$ is an alkyl radical having from 2 to 8 carbon atoms or an aryl radical, containing from 6 to 25% of alpha-olefins $CH_2=CHR^I$; (iii) copolymers of propylene with ethylene and one or more alpha-olefins $CH_2=CHR^I$, where $R^I$ has the aforesaid meaning, containing from 0.1 to 8% of ethylene and from 0.1 to 20% of alpha-olefins $CH_2=CHR^I$, on condition that the total content of ethylene and alpha-olefins $CH_2=CHR^I$ in the copolymers (iii) is greater than or equal to 5%.

2. The polyethylene composition of claim 1 containing, in addition:

C) from 0.5 to 10% by weight, relative to the total weight of A)+B)+C), of LDPE polyethylene.

3. The polyethylene composition of claim 1, wherein the component B) has a density less than 0.900 g/cm³.

4. The polyethylene composition of claim 1, wherein the component B) has a fraction insoluble in xylene at 25° C. greater than 70% by weight.

5. The polyethylene composition of claim 1, having haze values, measured on blown film of thickness 25 µm according to ASTM D 1003, less than or equal to 25%.

6. Mono- or multilayer film, wherein at least one layer comprises the polyethylene composition of claim 1.

7. Blown film according to claim 6.

* * * * *

UNITED STATES PATENT AND TRADEMARK OFFICE
CERTIFICATE OF CORRECTION

PATENT NO. : 6,437,047 B1  Page 1 of 1
DATED : August 20, 2002
INVENTOR(S) : Giuliano Cecchin et al.

It is certified that error appears in the above-identified patent and that said Letters Patent is hereby corrected as shown below:

Column 8,
Line 66, change "(4)" to -- (i) --.

Signed and Sealed this

Twenty-third Day of November, 2004

JON W. DUDAS
*Director of the United States Patent and Trademark Office*